United States Patent
Park et al.

(10) Patent No.: US 7,684,215 B2
(45) Date of Patent: Mar. 23, 2010

(54) SWITCHING MODE POWER SUPPLY AND DRIVING METHOD THEREOF

(75) Inventors: Young-Bae Park, Anyang (KR); Hang-Seok Choi, Gunpo (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 205 days.

(21) Appl. No.: 11/881,180

(22) Filed: Jul. 26, 2007

(65) Prior Publication Data

US 2008/0123380 A1      May 29, 2008

(30) Foreign Application Priority Data

Nov. 29, 2006      (KR) ...................... 10-2006-0119114

(51) Int. Cl.
*H02M 3/335*      (2006.01)

(52) U.S. Cl. .................................. 363/21.01; 363/21.1

(58) Field of Classification Search ................... 363/20, 363/21.01, 21.08, 21.1, 21.11, 21.16, 21.18, 363/97
See application file for complete search history.

(56) References Cited

U.S. PATENT DOCUMENTS

| | | | |
|---|---|---|---|
| 5,029,269 A | 7/1991 | Elliott et al. | |
| 5,073,849 A | 12/1991 | Morris | |
| 5,247,240 A | 9/1993 | Kayser et al. | |
| 5,315,496 A | 5/1994 | Okochi et al. | |
| 5,497,311 A | 3/1996 | Hanawaka | |
| 6,510,066 B2* | 1/2003 | Giannopoulos et al. | 363/97 |
| 6,906,503 B2* | 6/2005 | Lopez-Santillana et al. | 323/283 |
| 7,035,122 B2* | 4/2006 | Kim et al. | 363/21.18 |
| 7,292,461 B2* | 11/2007 | Nakamura | 363/21.01 |
| 7,595,624 B2* | 9/2009 | Tateishi et al. | 323/288 |

* cited by examiner

*Primary Examiner*—Adolf Berhane
(74) *Attorney, Agent, or Firm*—Sidley Austin LLP

(57) ABSTRACT

The present invention relates to a Switching Mode Power Supply (SMPS) and a driving method thereof. To this end, the present invention provides a SMPS, which is driven in either a Continuous Conduction Mode (CCM) or Discontinuous Conduction Mode (DCM) in accordance with a determination of a time when a voltage between a first stage and a second stage of the switching transistor is resonated. In accordance with the present invention, the SMPS of a quasi-resonant switching mode can be driven with high efficiency regardless of a signal level of an input voltage and the amount of an output terminal load.

24 Claims, 8 Drawing Sheets

SWITCHING MODE POWER SUPPLY AND DRIVING METHOD THEREOF

CROSS-REFERENCE TO RELATED APPLICATION

This application claims priority to and the benefit of Korean Patent Application No. 10-2006-0119114 filed in the Korean Intellectual Property Office on Nov. 29, 2006, the entire content of which is incorporated herein by reference.

BACKGROUND

1. Field of the Invention

The present invention relates to a Switching Mode Power Supply (hereinafter, referred to as "SMPS"). More particularly, the present invention relates to a SMPS of a quasi-resonant switching mode and a driving method thereof.

2. Description of the Related Art

The SMPS is a device for rectifying an input AC voltage to an input DC voltage (DC-Link voltage), and transforming the input DC voltage into a DC output voltage having a different level. SMPSs can be generally used in power electronic devices, for example, battery power supplies, such as mobile phones and laptop computers.

In general, the SMPS shows great conduction loss when an input voltage is lower than a specific level and small conduction loss when an input voltage is higher than a specific level. However, in this latter case the SMPS has an increased switching loss, making it difficult to improve its efficiency.

To solve the problem, a method of driving the SMPS in continuous conduction mode (hereinafter, referred to as "CCM") or discontinuous conduction mode (hereinafter, referred to as "DCM") has been proposed.

FIG. 1 is a graph illustrating the relationship between an input voltage and efficiency when the SMPS is driven in the CCM or DCM of the prior art. When the SMPS is driven in the CCM, the conduction loss is advantageously small when an input voltage is low, but the switching loss disadvantageously increases and efficiency is degraded when the input voltage increases or an output terminal load decreases. In contrast, when the SMPS is driven in the DCM, the switching loss can be reduced when an input voltage increases or an output terminal load decreases, since a transistor is turned on using a quasi-resonant switching mode when a drain voltage of the main switch of the SMPS is the lowest. However, when the input voltage is low, the conduction loss is greater in the DCM than in the CCM.

Therefore, there has been a need for a new driving method capable of improving driving efficiency of the conventional SMPS in the quasi-resonant switching mode.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a SMPS and a driving method thereof.

A SMPS according to an embodiment of the present invention includes a power supply unit comprising a switching transistor coupled to a first coil of a primary side of a transformer for transforming an input DC voltage, wherein the power supply unit supplies power to second and third coils of a secondary side of the transformer according to an operation of the switching transistor, and a Pulse Width Modulation (PWM) signal generator for receiving a feedback voltage corresponding to a first voltage generated form the second coil, a sense signal corresponding to current flowing through the switching transistor, and a third voltage corresponding to a second voltage generated from the third coil, and controlling turn on-off of the switching transistor. The PWM signal generator controls an on or off time of the switching transistor so that the SMPS is driven in either a Continuous Conduction Mode (CCM) or Discontinuous Conduction Mode (DCM) in accordance with a determination of a time when a voltage between a first stage and a second stage of the switching transistor is resonated. Furthermore, according to an embodiment of the present invention, there is provided a method of driving a SMPS that supplies power to a second coil and a third coil of a secondary side of a transformer according to an operation of a switching transistor coupled to a first coil of a primary side of the transformer for transforming an input DC voltage, the method including the steps of (a) sensing a turn-on time of the switching transistor, (b) generating a first pulse string signal to maintain a first level from the turn-on time to a first period, (c) determining whether a second voltage proportional to a first voltage generated in the third coil has a resonance waveform until a first time where the first pulse string signal shifts to a second level, (d) if, as a result of the determination, the second voltage does not have the resonance waveform until the first time, driving the SMPS in a CCM, and (e) if, as a result of the determination, the second voltage has the resonance waveform before the first time, driving the SMPS in a DCM.

DETAILED DESCRIPTION

Figure 1:
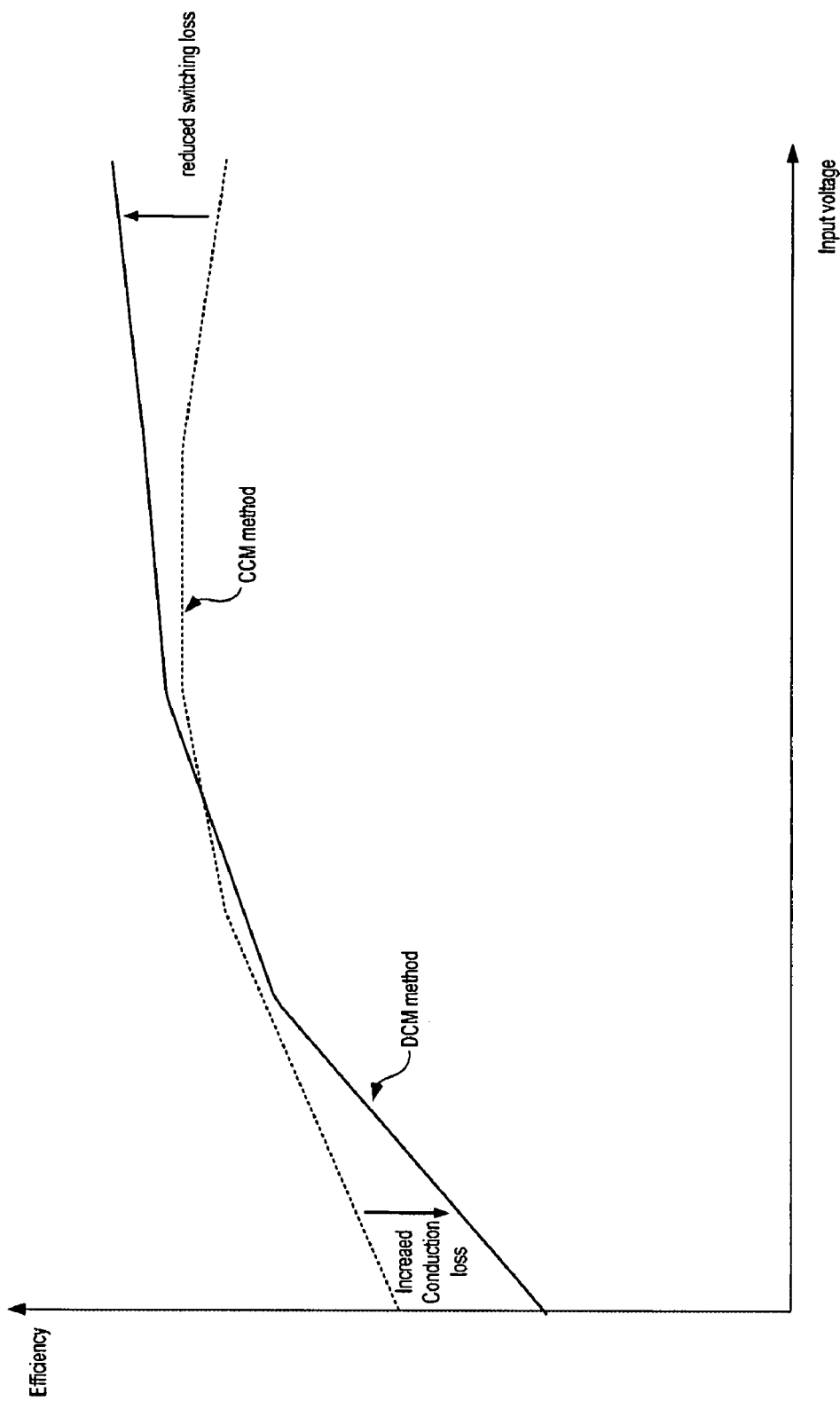
FIG. 1 is a graph illustrating the relationship between an input voltage and an efficiency when a SMPS is driven in a CCM or DCM in the prior art.

In the following detailed description, only certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "coupled" to the other element through a third element. In addition, when it is described that a SMPS is driven in the DCM, the SMPS is operated in a quasi-resonant switching mode.

To solve the above problems, the present invention provides a SMPS that is driven with high efficiency regardless of a signal level of an input voltage and the amount of an output terminal load, and a driving method thereof.

Figure 2:
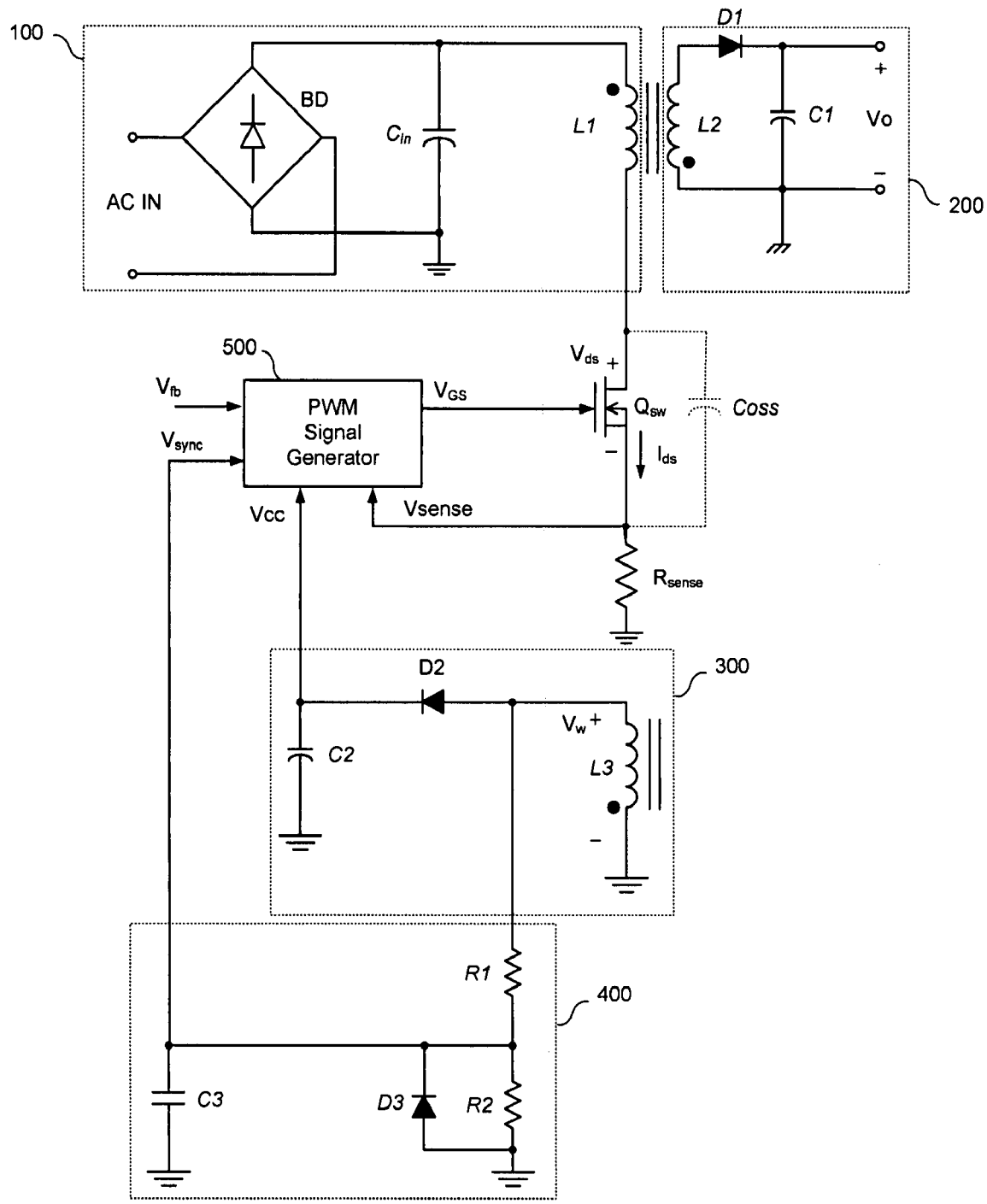
FIG. 2 is a circuit diagram showing an embodiment of a SMPS.

FIG. 2 is a circuit diagram showing an embodiment of a SMPS. The SMPS may include a power supply unit 100, an output unit 200, a bias voltage supplier 300, a sync voltage Vsync generator 400 and a Pulse Width Modulation (PWM) signal generator 500.

The power supply unit 100 may include a bridge diode BD for rectifying an AC input, a capacitor Cin for smoothing the rectified voltage, and a primary coil L1 of a transformer having one terminal connected to the capacitor Cin. The power supply unit 100 may transform the AC voltage into a DC voltage Vin using the bridge diode BD and the capacitor Cin, and may supply power to a secondary side of the transformer according to the duty of a switching transistor Qsw.

The output unit 200 may include a secondary coil L2 of the transformer, a diode D1 having an anode connected to one terminal of the secondary coil L2 of the transformer, and a capacitor C1 connected between a cathode of the diode D1 and a ground terminal. The voltage across the capacitor C1 is an output voltage Vo.

The bias voltage supplier 300 may include a secondary coil L3 of the transformer, a diode D2 having an anode connected to one terminal of the secondary coil L3 of the transformer, and a capacitor C2 connected between a cathode of the diode D2 and a ground terminal. The PWM signal generator 500 can be generally implemented using an Integrated Circuit (IC). The bias voltage supplier 300 may supply a bias voltage Vcc for driving the IC of the PWM signal generator 500.

In operation, if the switching transistor Qsw is repeatedly turned on and off, a voltage Vw is induced in the secondary coil L3 of the transformer. This induced voltage Vw charges the capacitor C2 through the diode D2, generating a bias voltage Vcc.

The sync voltage generator 400 may include a resistor R1 having one terminal connected to one terminal of the secondary coil L3 of the transformer, a resistor R2 having one terminal connected to the other terminal of the resistor R1 and the other terminal connected to a ground terminal, a diode D3 having a cathode connected to a node between the resistors R1 and R2 and an anode connected to the ground terminal, and a capacitor C3 having one terminal connected to the node between the resistors R1 and R2 and the other terminal connected to a ground terminal. The sync voltage generator 400 may serve to supply the sync voltage Vsync to the PWM signal generator 500. The sync voltage Vsync results from the induced voltage Vw, which is generated in the secondary coil L3 of the transformer, divided by the resistors R1 and R2, and then charged across the capacitor C3.

The PWM signal generator 500 can receive a feedback signal Vfb, and a signal Vsense, which is a sensed signal of a current Ids flowing through the switching transistor Qsw. The PWM signal generator 500 may compare the feedback signal Vfb and the signal Vsense, generate a pulse width modulation signal according to the comparison result, and output a gate control signal VGS to control the turn-on/off of the switching transistor Qsw. The feedback signal Vfb can be a signal having information corresponding to the output voltage Vo, and can be used to decide a turn-off time of the switching transistor Qsw.

The PWM signal generator 500 may determine that the SMPS will operate according to which one of the CCM and the DCM based on a type of the sync voltage Vsync supplied from the sync voltage generator 400. This will be described in detail later on with reference to FIGS. 3 to 8.

Figure 3:
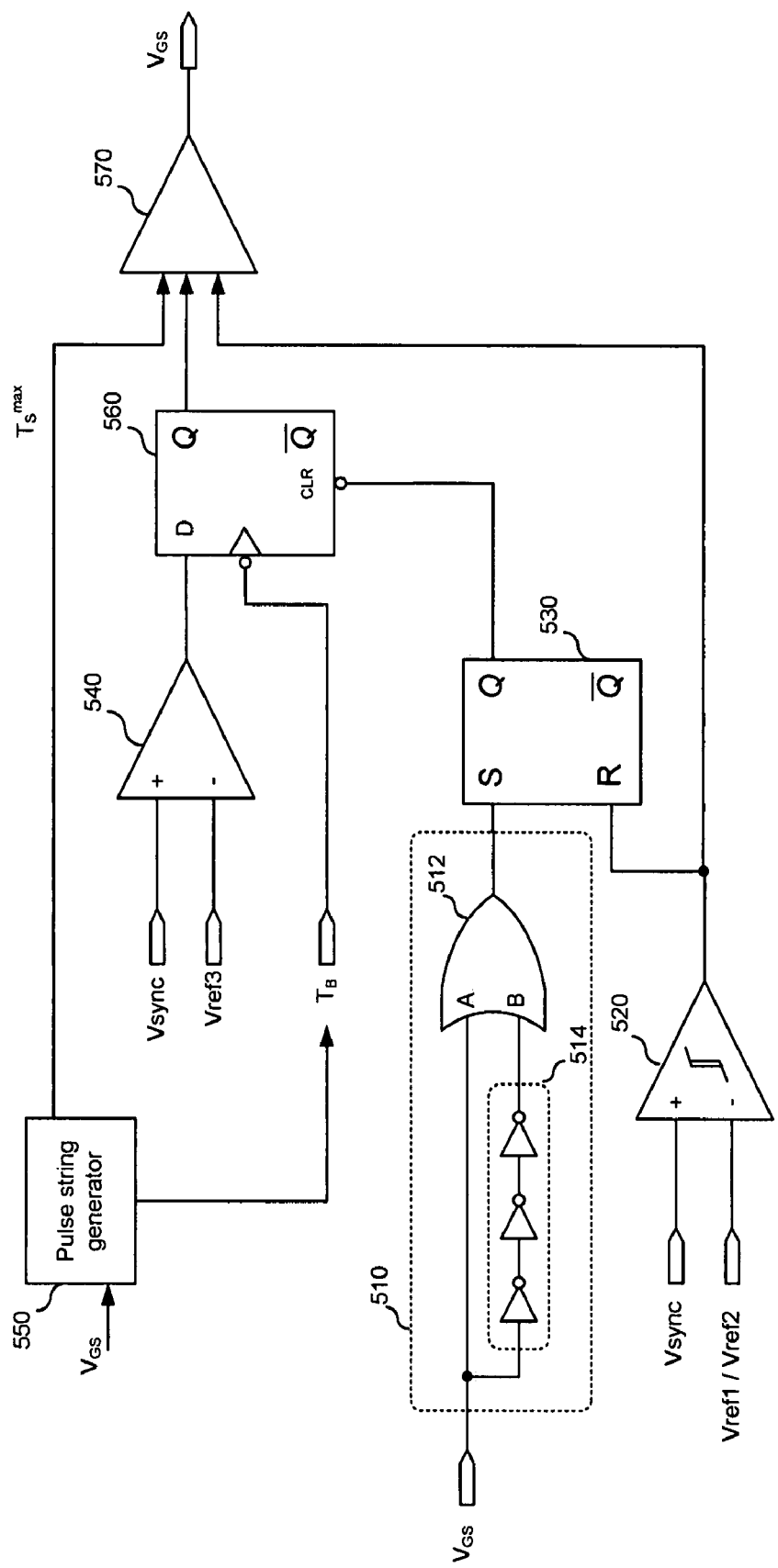
FIG. 3 is a detailed circuit diagram of a PWM signal generator 500.

FIG. 3 is a detailed circuit diagram of the PWM signal generator 500. Circuits related to a portion for receiving the feedback signal Vfb, and the signal Vsense, and producing the gate control signal VGS are omitted from FIG. 3.

The PWM signal generator 500 may include a falling edge pulse generator 510, a comparator 520, an SR NAND latch 530, a comparator 540, a pulse string generator 550, a D flip-flop 560 and a gate driver 570.

The falling edge pulse generator 510 can include an OR gate 512 and a signal delayer 514. The falling edge pulse generator 510 can sense the gate control signal VGS input to the OR gate 512 as a high level signal when the gate control signal VGS is higher than a predetermined voltage, and the gate control signal VGS as a low level signal when the gate control signal VGS is lower than a predetermined voltage.

The gate control signal VGS can be input to the A input terminal of the OR gate 512, and input with a delay and inverted through the signal delayer 514 to the B input terminal of the OR gate 512.

The signal delayer 514 may include an odd number of inverters and thus inverts a received signal and outputs the result to the OR gate 512. Inverters, having a number greater or smaller than three, can be also used based on the speed of elements included in the PWM signal generator 500 reacting to an input signal.

If the gate control signal VGS is a high level, then a high level signal is input to the A input terminal of the OR gate 512, and a low level signal is input to the B input terminal. If the gate control signal VGS is a low level, then a low level signal is input to the A input terminal of the OR gate 512, and a high level signal is input to the B input terminal.

If the gate control signal VGS shifts from a low level to a high level, a signal input to the A input terminal of the OR gate 512 shifts from a low level to a high level, but a signal input to the B input terminal remains at a high level for a signal delay time proportional to the number of inverters included in the signal delayer 514, and only then shifts to a low level. Through this time, the output signal of the OR gate 512 continues to maintain a high level.

If the gate control signal VGS shifts from a high level to a low level, a signal input to the A input terminal of the OR gate 512 shifts from a high level to a low level, but a signal input to the B input terminal remains at a low level as long for a signal delay time proportional to the number of inverters included in the signal delayer 514, and then shifts to a high level. During this signal delay time, the output signal of the OR gate 512 shifts from a high level to a low level and then shifts back to a high level again. In other words, the output signal of the OR gate 512 shifts from a high level to a low level when a signal input to the A input terminal of the OR gate 512 shifts from a high level to a low level, and then shifts back to a high level again when a signal input to the B input terminal of the OR gate 512 shifts from a low level to a high level. This operation is different from when the gate control signal VGS shifts from a low level to a high level. Due to this difference, the output signal of the falling edge pulse generator 510 generates a short pulse, consisting of the output signal shifting to a low level only when the gate control signal VGS shifts from a high level to a low level, and then returning to a high level after a predetermined signal delay time. The output signal of the falling edge pulse generator 510 can be input to a set terminal S of the SR NAND latch 530.

The comparator 520 can compare the sync voltage Vsync input to a non-inverting input terminal and two reference voltages Vref1 and Vref2, input to an inverting input terminal. The comparator 520 can generate a high level signal or a low level signal according to the comparison result and output a generated signal to a reset terminal R of the SR NAND latch 530 and the gate driver 570. The comparator 520 can output a high level signal when the sync voltage Vsync is higher than the reference voltage Vref2, and output a low level signal when the sync voltage Vsync is lower than the reference voltage Vref1. The reference voltages Vref1 and Vref2 may be voltages that are previously set by a circuit designer, and the reference voltage Vref2 is set higher than the reference voltage Vref1. If the sync voltage Vsync is higher than the reference voltage Vref1 but lower than the reference voltage Vref2, the comparator 520 continues to output a previous output signal. The comparator 520 can be implemented using a Schmidt Trigger.

The SR NAND latch 530 can output a high level or low level signal through a non-inverting output terminal Q, which is generated in response to the output signal of the falling edge pulse generator 510, input to the set terminal S, and in response to the output signal of the comparator 520, input to the reset terminal R. The output signal of the SR NAND latch 530 can be output to the "clear" signal input terminal CLR of the D flip-flop 560.

The comparator 540 can compare the sync voltage Vsync, input to a non-inverting input terminal and a reference voltage Vref3, input to an inverting input terminal, and output a high level signal when the sync voltage Vsync is higher than the reference voltage Vref3 and output a low level signal when the sync voltage Vsync is lower than the reference voltage Vref3, as a result of the comparison.

The reference voltage Vref3 can be set higher than the reference voltages Vref1 and Vref2. The reference voltages Vref1, Vref2 and Vref3 are described in detail below.

The voltage Vw, induced in the secondary coil L3 of the transformer is proportional to a turn ratio of the primary coil L1, the secondary coil L2 and the secondary coil L3 of the transformer, and is lower than a voltage between the drain and source of the switching transistor Qsw (hereinafter, referred to as "Vds voltage") by the DC voltage Vin applied across the capacitor Cin included in the power supply unit 100.

The sync voltage Vsync can be proportional to the voltage Vw induced in the secondary coil L3 of the transformer and the PWM signal generator 500 can compare the sync voltage Vsync with the reference voltages Vref1, Vref2 and Vref3.

The sync voltage Vsync can be a voltage that is divided from the voltage Vw induced in the secondary coil L3 of the transformer and charged in the capacitor C3. Therefore, the sync voltage Vsync remains at a voltage that is less than 0V when the voltage Vw at the secondary coil L3 of the transformer becomes negative due to a resonance.

The resistance of the resistors R1 and R2 and the capacitance of the capacitor C3 in the sync voltage generator 400 can determine the zero-crossing point where the sync voltage Vsync changes from a positive value to a negative value according to a resonance waveform of the voltage Vw by an RC time delay.

The resistance of the resistors R1 and R2 and the capacitance of the capacitor C3 can be set to values that enable the zero-crossing point to become the time where the drain voltage of the switching transistor Qsw becomes lowermost.

The reference voltage Vref1 can be used to determine whether the sync voltage Vsync has reached a zero-crossing point when the SMPS is driven in the DCM. In general, the reference voltage Vref1 is set somewhat higher than 0V. The reference voltage Vref2 can be used to determine whether the resonance waveform of the sync voltage Vsync rose past the zero-crossing point, and is set somewhat higher than the reference voltage Vref1. The reference voltage Vref3 can be used to determine whether the sync voltage Vsync resonates, and set somewhat lower than the sync voltage Vsync before its resonance.

The pulse string generator 550 can generate signals TB and TSmax, and supply the signal TB to a clock signal input terminal of the D flip-flop 560 and the signal TSmax to the gate driver 570. The signal TB can be a pulse string signal, which assumes a high level for a predetermined time from a time at which the gate control signal VGS shifts to a high level, and then has a low level for a short time. The signal TB can serve to prevent the gate control signal VGS from shifting a low level to a high level while the signal TB is maintained a high level, so that the switching transistor Qsw is prevented from turning on. The signal TSmax can be a pulse string signal, which assumes a high level during a time in which a predetermined time TW is added to an interval where the signal TB is a high level, and then has a low level for a short time. The time TW can be time used to determine whether the sync voltage Vsync has reached the zero-crossing point after the signal TB shifted from a high level to a low level. In this case, the pulse string refers to a group of pulses that are continuously toggled at a constant duty.

The D flip-flop 560 can output a signal received from the comparator 540 through a non-inverting output terminal Q when the TB signal falls from a high level to a low level (falling edge).

The inverse of the output signal of the non-inverting output terminal Q of the SR NAND latch 530 can be input to the clear signal input terminal CLR of the D flip-flop 560. Due to this, if the output signal of the non-inverting output terminal Q of the SR NAND latch 530 becomes a low level, a signal output through the non-inverting output terminal Q of the D flip-flop 560 becomes a low level regardless of the output signal of the comparator 540 and the signal TB.

The gate driver 570 can prevent the gate control signal VGS from changing to a high level until the signal TB toggles from a high level to a low level. If the signal output through the non-inverting output terminal Q of the D flip-flop 560 has a high level until the signal TB toggles from a high level to a low level, the gate driver 570 drives the SMPS in the CCM by changing the gate control signal VGS to a high level, and drives the SMPS in the DCM in other cases.

If it is determined that the sync voltage Vsync has reached the zero-crossing point while the signal TSmax remains a high level after the signal TB shifts to a low level, the gate driver 570 can change the gate control signal VGS to a high level, thus turning on the switching transistor Qsw. In this case, the gate driver 570 can employ the reference voltages Vref1 and Vref2 in order to determine whether the sync voltage Vsync has reached the zero-crossing point. The gate driver 570 may determine that the sync voltage Vsync rises if the output signal of the comparator 520 changes from a low level to a high level and consider that a time at which the output signal of the comparator 520 changes from a high level to a low level as a point where the sync voltage Vsync has reached the zero-crossing point, and thus changes the gate control signal VGS to a high level.

If it was not determined that the sync voltage Vsync reached the zero-crossing point while the signal TSmax remained a high level after the signal TB signal shifted to a low level, that is, if the output signal of the comparator 520 does not change from a high level to a low level, the gate driver 570 may turn on the switching transistor Qsw by changing the gate control signal VGS to a high level simultaneously when the signal TSmax becomes a low level.

The operation of the SMPS implemented through the above-mentioned PWM signal generator 500 is described in detail below with reference to FIGS. 4 and 5.

Figure 4:
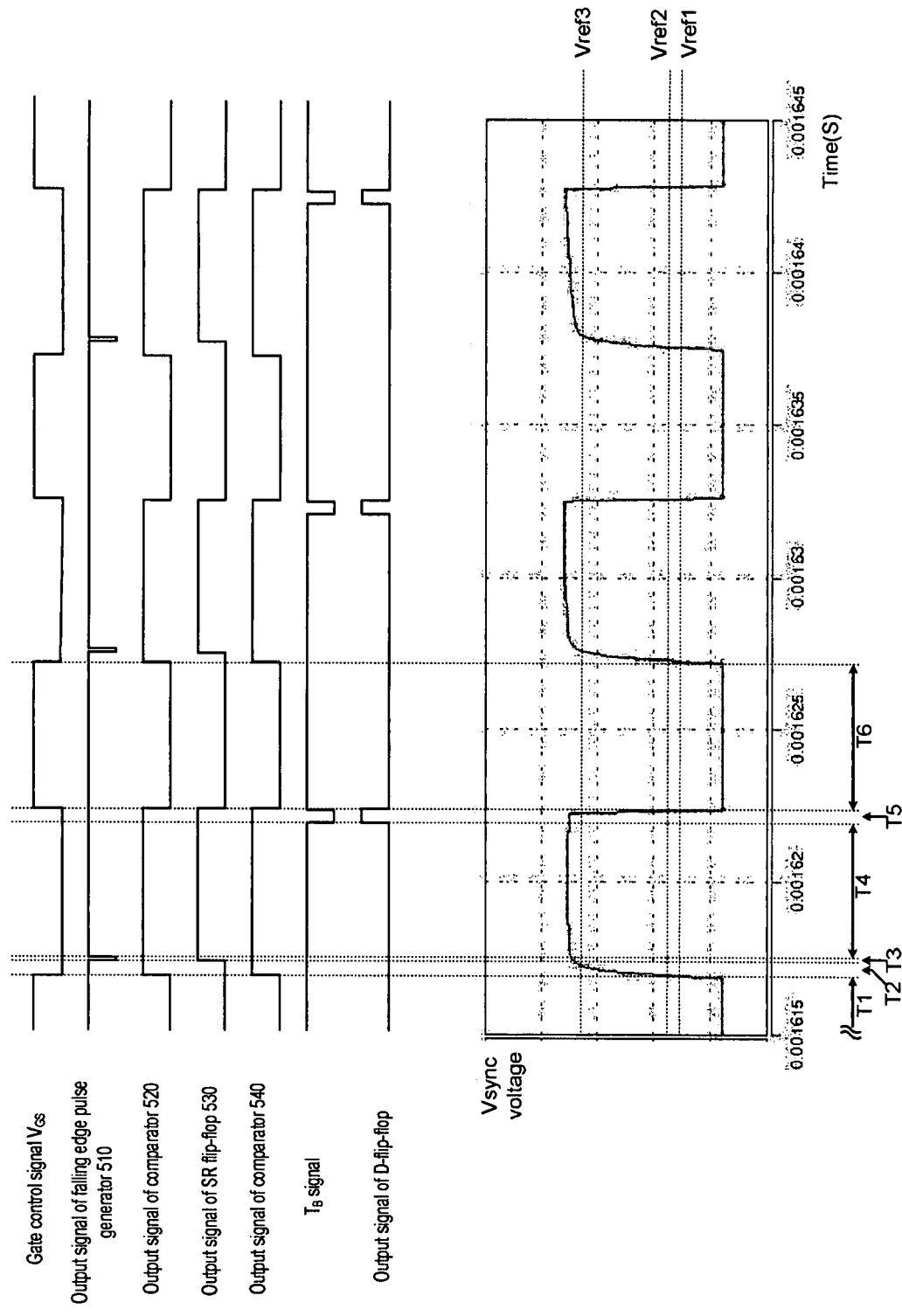
FIG. 4 illustrates output waveforms of constituent elements included in the PWM signal generator 500 and a waveform of a sync voltage Vsync when the SMPS is driven in the CCM.

FIG. 4 illustrates output waveforms of the elements included in the PWM signal generator 500 and the corresponding waveform of the sync voltage Vsync when the SMPS is driven in the CCM.

In a period T1, the gate control signal VGS can be in a high level state, and the switching transistor Qsw is turned on accordingly. Since the gate control signal VGS is in a high level state, the output signal of the falling edge pulse generator 510 is a high level. Further, since the sync voltage Vsync is lower than the reference voltage Vref1, the output signal of the comparator 520 has a low level. Accordingly, the output signal of the non-inverting output terminal Q of the SR NAND latch 530 becomes a low level, and the non-inverting output terminal Q of the D flip-flop 560 outputs a low level signal.

In a period T2, the gate control signal VGS can shift to a low level, and therefore the switching transistor Qsw is turned off. The period T2 can be a short period before the output signal of the falling edge pulse generator 510 changes from a high level to a low level after the gate control signal VGS has changed to a low level. At this time, the voltage Vds rises. Correspondingly, the sync voltage Vsync rises and becomes higher than the reference voltage Vref2, so that the comparator 520 outputs a high level signal. Accordingly, the output signal of the non-inverting output terminal Q of the SR NAND latch (refer to 530 in FIG. 3) becomes a low level, and the non-inverting output terminal Q of the D flip-flop 560 outputs a low level signal.

In a period T3, the output signal of the falling edge pulse generator 510 can change from a high level to a low level. At this time, the sync voltage Vsync is still higher than the reference voltage Vref2, and the comparator 520 outputs a high level signal. Therefore, the output signal of the non-inverting output terminal Q of the SR NAND latch 530 changes from a low level to a high level. Meanwhile, since the sync voltage Vsync is higher than the reference voltage Vref3, the comparator 540 outputs a high level signal. At this time, the signal TB is not toggled, but remains a high level. Thus, the non-inverting output terminal Q of the D flip-flop 560 keeps outputting a low level signal.

In a period T4, the output signal of the falling edge pulse generator 510 can shift from a low level to a high level. At this time, since the sync voltage Vsync is still higher than the reference voltage Vref2, the comparator 520 outputs a high level signal, and the output signal of the non-inverting output terminal Q of the SR NAND latch 530 remains a high level. Meanwhile, since the sync voltage Vsync is higher than the reference voltage Vref, the comparator 540 outputs a high level signal. At this time, the signal TB is not toggled, but remains a high level. Therefore, the non-inverting output terminal Q of the D flip-flop 560 keeps outputting a low level signal.

In a period T5, the signal TB can change from a high level to a low level. Accordingly, the D flip-flop 560 outputs a high level signal, which is received from the comparator 540 through the non-inverting output terminal Q when the signal TB toggles from a high level to a low level. If it is determined that a signal received from the D flip-flop 560 shifts to a high level, the gate driver 570 changes the gate control signal VGS to a high level, thus turning on the switching transistor Qsw. In FIG. 4, the time at which the gate control signal VGS shifts to a high level is shown as the time at which the period T6 begins because of a signal delay time is taken into consideration.

In a period T6, as the switching transistor Qsw turns on, the voltage Vds can fall. Accordingly, the sync voltage Vsync falls and becomes lower than the reference voltage Vref1, so that the output signal of the comparator 520 changes from a high level to a low level. At this time, the output signal of the falling edge pulse generator 510 keeps a high level. Accordingly, the output signal of the non-inverting output terminal Q of the SR NAND latch 530 changes from a high level to a low level, and the output signal of the non-inverting output terminal Q of the D flip-flop 560 also changes from a high level to a low level signal regardless of the level of a signal received from the comparator 540.

Meanwhile, periods subsequent to the period T6 are the same as those subsequent to the period T2 and will not be described.

Figure 5:
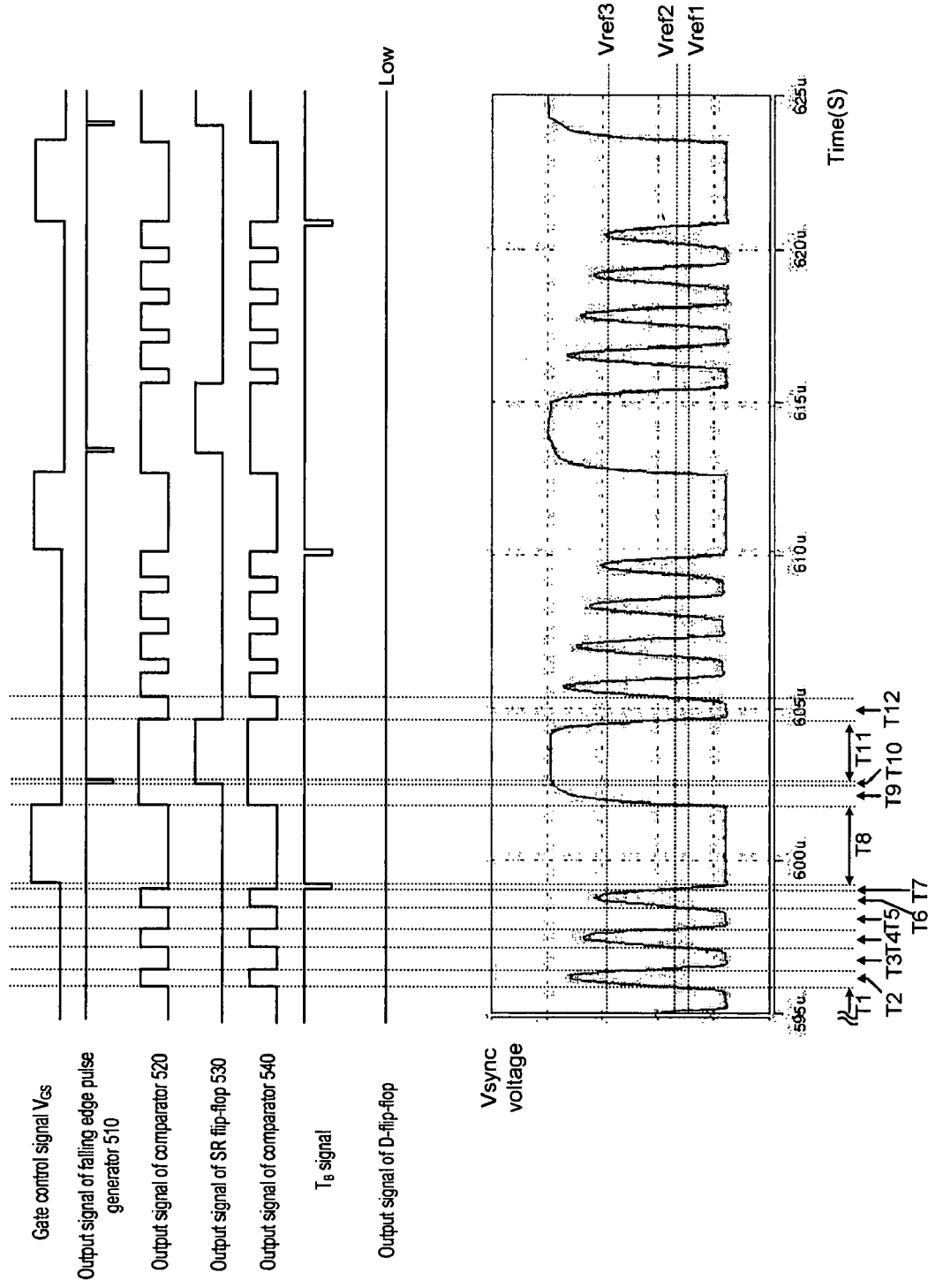
FIG. 5 illustrates output waveforms of constituent elements included in the PWM signal generator 500 and a waveform of a sync voltage Vsync when the SMPS is driven in the DCM.

FIG. 5 illustrates output waveforms of the elements included in the PWM signal generator 500 and a corresponding waveform of the sync voltage Vsync when the SMPS is driven in the DCM.

In a period T1, since the gate control signal VGS is in a low level state, the switching transistor Qsw can be turned off. Since the gate control signal VGS is in a low level state, the output signal of the falling edge pulse generator 510 keeps a high level. Since the sync voltage Vsync is lower than the reference voltage Vref1, the output signal of the comparator 520 has a low level, and the output signal of the non-inverting output terminal Q of the SR NAND latch 530 become also a low level. At this time, the signal TB is not toggled, but remains a high level. Thus, the non-inverting output terminal Q of the D flip-flop 560 continues to output a low level signal.

In a period T2, since the gate control signal VGS is in a low level state, the output signal of the falling edge pulse generator 510 can remain a high level, and since the sync voltage Vsync is higher than the reference voltage Vref2, the output signal of the comparator 520 has a high level. Accordingly, the output signal of the non-inverting output terminal Q of the SR NAND latch 530 keeps a low level, and the signal TB is not toggled and keeps a high level. Thus, the non-inverting output terminal Q of the D flip-flop 560 continues to output the low level signal.

Periods from a period T3 to a period T6 are the same as the periods T1 and T2, and will not be described in order to avoid redundancy.

Thereafter, in a period T7, the signal TB can change from a high level to a low level. At this time, since the output signal of the non-inverting output terminal Q of the SR NAND latch 530 keeps a low level, the D flip-flop 560 outputs a signal, which is received from the comparator 540 through the non-inverting output terminal Q when the signal TB toggles from a high level to a low level. In the period T7, since the output signal of the comparator 540 is a low level signal, the non-inverting output terminal Q of the D flip-flop 560 outputs a low level signal. At this time, the sync voltage Vsync becomes lower than the reference voltage Vref1 and, therefore, the gate driver 570 determines that the sync voltage Vsync has reached the zero-crossing point and changes the gate control signal VGS to a high level, thus turning on the switching transistor Qsw. In FIG. 5, the time at which the gate control signal VGS shifts to a high level is shown as the time at which the period T8 begins because a signal delay time is taken into consideration.

In the period T8, as the switching transistor Qsw is turned on, the voltage Vds can fall. Correspondingly, the sync voltage Vsync remains lower than the reference voltage Vref1, and the output signal of the comparator 520 remains a low level. At this time, the output signal of the falling edge pulse generator 510 remains a high level, and the output signal of the non-inverting output terminal Q of the SR NAND latch 530 remains a low level. In a period T9, the signal TB can be toggled from a low level to a high level, and the non-inverting output terminal Q of the D flip-flop 560 outputs the low level signal that is previously output.

In the period T9, as the gate control signal VGS changes to a low level and the switching transistor Qsw turns off, the sync voltage Vsync can rise and thus become higher than the reference voltage Vref2. Accordingly, the output signal of the comparator 520 changes from a low level to a high level. The period T9 can be a short period before the output signal of the falling edge pulse generator 510 changes from a high level to a low level after the gate control signal VGS has changed to a low level. At this time, as the output signal of the falling edge pulse generator 510 keeps a high level, the output signal of the non-inverting output terminal Q of the SR NAND latch 530 keeps a low level, and the non-inverting output terminal Q of the D flip-flop 560 continues outputting the low level signal.

In a period T10, the output signal of the falling edge pulse generator 510 can change from a high level to a low level. At this time, since the sync voltage Vsync still keeps higher than the reference voltage Vref2, the comparator 520 outputs a high level signal. Accordingly, the output signal of the non-inverting output terminal Q of the SR NAND latch 530 changes from a low level to a high level. Meanwhile, since the sync voltage Vsync is higher than the reference voltage Vref3, the comparator 540 outputs a high level signal. At this time, the signal TB is not toggled, but keeps a high level. Thus, the non-inverting output terminal Q of the D flip-flop 560 continues outputting the low level signal.

In a period T11, the output signal of the falling edge pulse generator 510 can change from a low level to a high level. At this time, since the sync voltage Vsync still remains higher than the reference voltage Vref2, the comparator 520 outputs a high level signal and the output signal of the non-inverting output terminal Q of the SR NAND latch 530 remains a high level. Meanwhile, since the sync voltage Vsync is higher than the reference voltage Vref3, the comparator 540 outputs a high level signal. At this time, the signal TB is not toggled, but remains a high level. Therefore, the non-inverting output terminal Q of the D flip-flop 560 continues outputting the low level signal that is previously output. The sync voltage Vsync may start resonance in the second half of the period T11.

In a period T12, the sync voltage Vsync can resonate and fall below the reference voltage Vref1. Accordingly, the output signal of the comparator 520 changes from a high level to a low level. At this time, since the output signal of the falling edge pulse generator 510 keeps a high level, the output signal of the non-inverting output terminal Q of the SR NAND latch 530 changes from a high level to a low level. Meanwhile, as the sync voltage Vsync is lower than the reference voltage Vref3, the comparator 540 outputs a low level signal. At this time, the signal TB is not toggled, but remains a high level. Thus, the non-inverting output terminal Q of the D flip-flop 560 continues outputting the low level signal. Periods after the period T12 are essentially the same as those following the period T1, and will not be described.

Switching of a driving method of another SMPS, as illustrated in FIGS. 3 to 5, is described in short below.

If the gate control signal VGS changes to a low level and the switching transistor Qsw is turned off, the falling edge pulse generator 510 outputs a low level signal for a short period of time. When the signal level of the sync voltage Vsync continues to remain higher than the reference voltage Vref2 from a point of time at which the output signal of the falling edge pulse generator 510 becomes a low level (hereinafter, referred to as a "time A") to a point of time at which the signal TB is toggled from a high level to a low level (hereinafter, referred to as a "time B"), the output signal of the non-inverting output terminal of the SR NAND latch 530 can remain a high level signal from time A to time B. If the sync voltage Vsync even temporarily falls below the reference voltage Vref1 from time A to time B, the output signal of the SR NAND latch 530 changes to a low level and the output signal of the non-inverting output terminal Q of the D flip-flop 560 remains a low level. The sync voltage Vsync being lower than the reference voltage Vref1 indicates that the sync voltage Vsync resonates. Furthermore, whether the sync voltage Vsync resonates within the period TB is dependent on the signal level of the input voltage Vin or the amount of the output terminal load. That is, the sync voltage Vsync resonates when the input voltage Vin is high or when the amount of the output terminal load is low. Meanwhile, if the sync voltage Vsync does not resonate, the sync voltage Vsync remains higher than the reference voltage Vref3 from when the switching transistor Qsw is turned off to when the switching transistor Qsw is turned on next time. Accordingly, at time B, a high level signal is input to the gate driver 570 through the non-inverting output terminal Q of the D flip-flop 560 and the gate driver 570 drives the switching transistor Qsw in the CCM.

In sum, the PWM signal generator 500 drives the switching transistor Qsw in the CCM or DCM according to the signal level of the sync voltage Vsync from time A to time B.

Hereinafter, an embodiment of the driving principle of the SMPS is described with reference to FIGS. 6 to 8.

Figure 6:
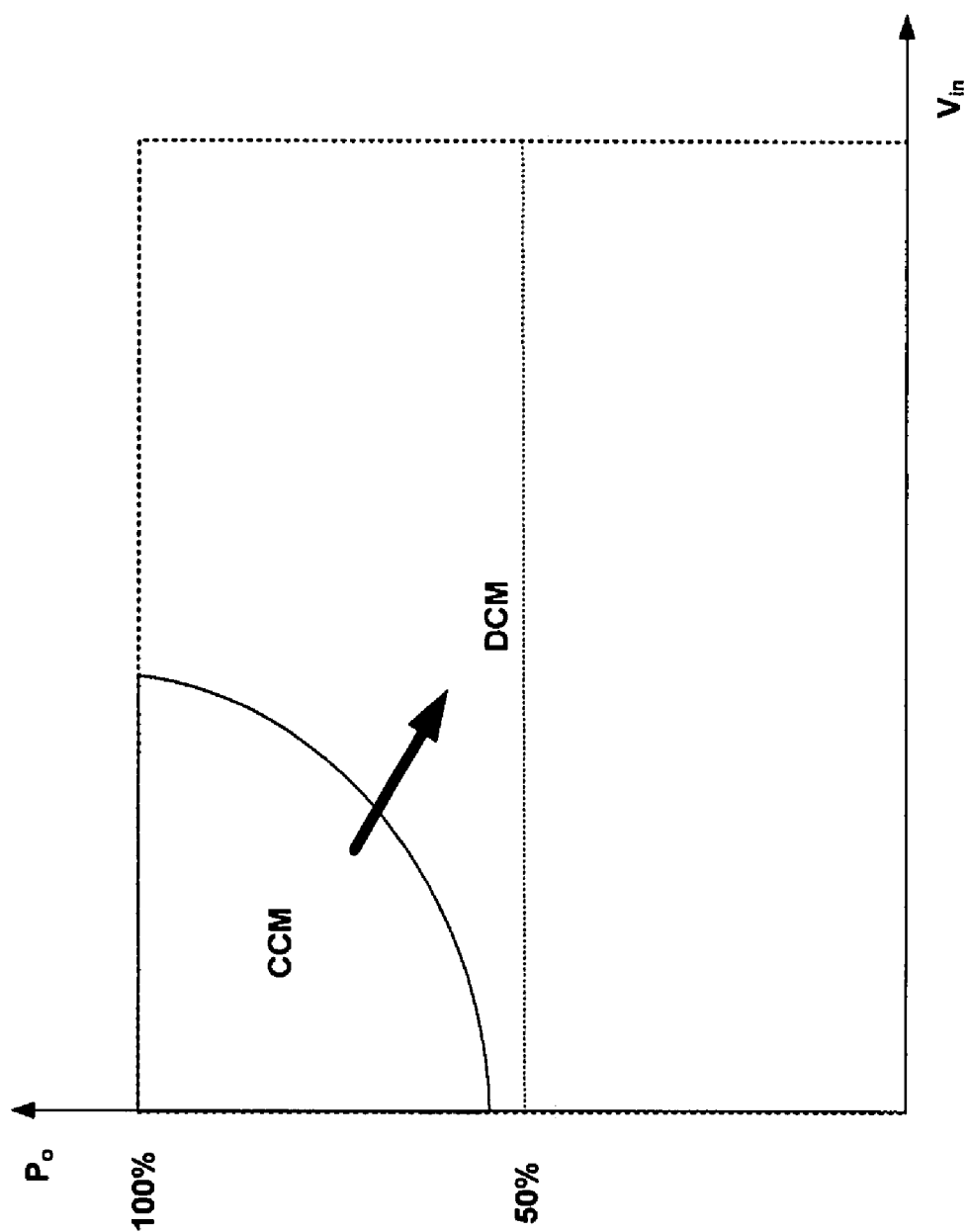
FIG. 6 is a view illustrating a variation of an operation mode of the SMPS depending on a variation of an input voltage and load.

FIG. 6 illustrates a variation of an operation mode of the SMPS depending on a variation of an input voltage and load.

As mentioned above with reference to FIGS. 2 to 5, the SMPS of the quasi-resonant switching mode is selectively driven in the CCM or the DCM according to the signal level of the sync voltage Vsync.

In FIG. 6, a region in which the SMPS is driven in the CCM varies according to an inductance value of the primary coil L1 of the transformer included in the power supply unit 100. In other words, if the inductance of the primary coil L1 of the transformer is higher, the region in which the SMPS is driven in the CCM is enlarged even if the input voltage Vin or the amount of the output terminal load is the same.

Figure 7:
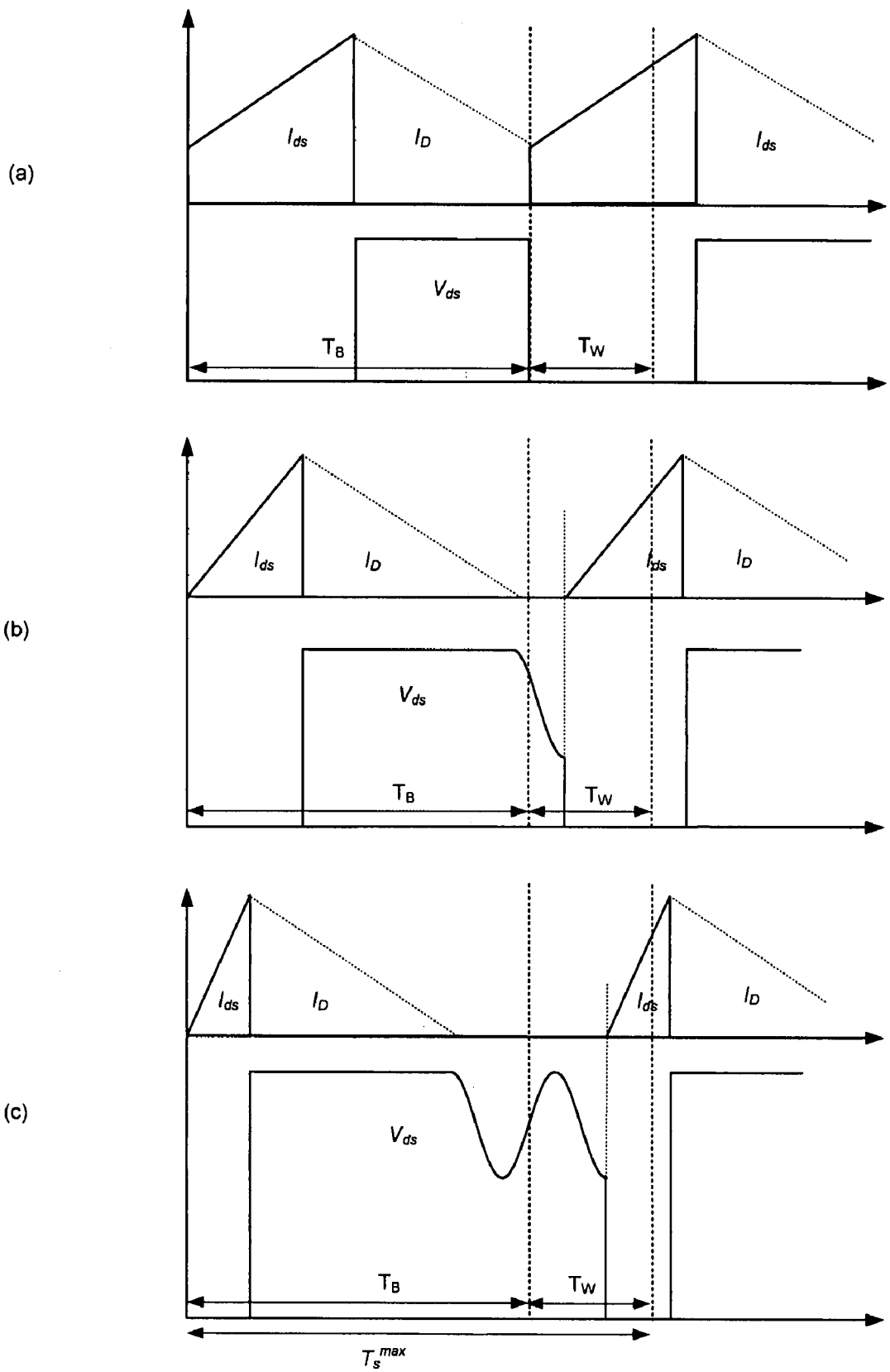
FIG. 7 is a view illustrating variation in a driving method in which the SMPS is driven in the CCM and then driven in the DCM as an input voltage Vin increases.

FIG. 7 illustrates an embodiment of the driving method in which the SMPS is driven in the CCM and then driven in the DCM as the input voltage Vin increases.

From FIGS. 7(a) to 7(c), it can be seen that the slope of the current Ids flowing from the drain to the source of the switching transistor Qsw is proportional to the input voltage Vin. Visibly, the input voltage Vin increases from FIG. 7(a) to FIG. 7(c), and therefore the slope of the current Ids increases as well.

As mentioned above, the SMPS is driven in the CCM when the input voltage Vin is low, and is driven in the DCM when the input voltage Vin rises. Accordingly, in FIG. 7(a) in which the input voltage Vin is the lowest, the SMPS is driven in the CCM, and in FIGS. 7(b) and 7(c), the SMPS is driven in the DCM as the input voltage Vin rises.

Figure 8:
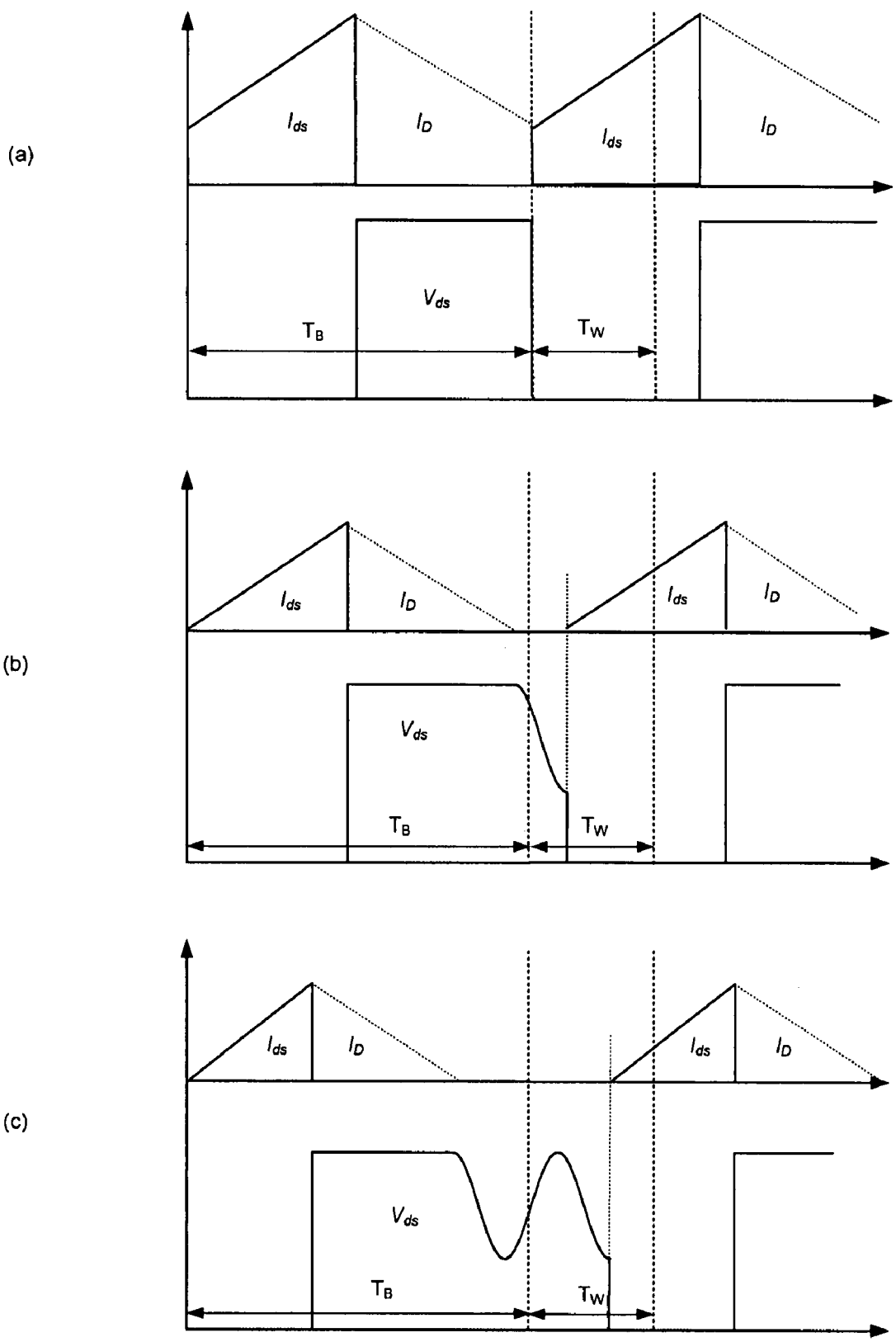
FIG. 8 is a view illustrating variation in a driving method in which the SMPS is driven in the CCM and then driven in the DCM as an output terminal load of an output unit (200 in FIG. 2) decreases.

FIG. 8 illustrates an embodiment of the driving method in which the SMPS is driven in the CCM and then driven in the DCM as the output terminal load of the output unit 200 decreases.

First, in FIGS. 8(a) to 8(c), the input voltage Vin is essentially the same and, therefore, the slope of the current Ids flowing from the drain to the source of the switching transistor Qsw is essentially the same. If the output terminal load of the output unit 200 decreases, the amount of the current Ids flowing from the drain to the source of the switching transistor Qsw decreases. Indeed, it can be seen that the output terminal load of the output unit 200 decreases from FIG. 8(a) toward FIG. 8(c).

As mentioned above, the SMPS is driven in the CCM when the output terminal load of the output unit 200 is high, and is driven in the DCM if the output terminal load of the output unit 200 in FIG. 2. Accordingly, in FIG. 8(a) in which the output terminal load of the output unit 200 is the highest, the SMPS is driven in the CCM. In FIGS. 8(b) and 8(c), the SMPS is driven in the DCM as the load is decreasing.

The SMPS as described above is driven in the CCM or the DCM according to the input voltage Vin and the amount of the output terminal load, and therefore can be driven with high efficiency regardless of the input voltage Vin and the output terminal load.

The exemplary embodiments of the present invention as described above are not implemented through only an apparatus and method, but can be implemented through a software, program, or data structure for realizing functions corresponding to the above embodiments on a recording medium in which the program is recorded. Such implementation will be evident to those having ordinary skill in the art from the description of the above embodiments.

While this invention has been described in connection with particular embodiments, it is understood that the invention is not limited to the disclosed embodiments, but, on the contrary, is intended to cover various modifications and equivalent arrangements included within the spirit and scope of the appended claims.

What is claimed is:

1. A Switching Mode Power Supply (SMPS), comprising:
a power supply unit comprising a switching transistor coupled to a first coil of a primary side of a transformer for transforming an input DC voltage, wherein the power supply unit supplies power to second and third coils of a secondary side of the transformer according to an operation of the switching transistor; and
a Pulse Width Modulation (PWM) signal generator configured to receive a feedback voltage corresponding to a first voltage generated from the second coil, a sense signal corresponding to current flowing through the switching transistor, and a third voltage corresponding to a second voltage generated from the third coil, and to control a turn on-off operation of the switching transistor,
wherein the PWM signal generator controls an on or off time of the switching transistor so that the SMPS is driven in either a Continuous Conduction Mode (CCM) or Discontinuous Conduction Mode (DCM) in accordance with a determination of a time when a voltage between a drain and a source of the switching transistor is resonated.

2. The SMPS of claim 1, wherein the PWM signal generator is configured to control the on or off time of the switching transistor according to a signal level of the third voltage.

3. The SMPS of claim 2, further comprising a third voltage generator for dividing the second voltage and generating the third voltage.

4. The SMPS of claim 3, wherein the third voltage generator comprises:
a first resistor having one terminal connected to one terminal of the third coil;
a second resistor having one terminal connected to the other terminal of the first resistor and the other terminal connected to a ground; and
a first capacitor having one terminal connected to a node between the first and second resistors and the other terminal connected to a ground.

5. The SMPS of claim 4, wherein the third voltage is a voltage charged into the first capacitor.

6. The SMPS of claim 2, wherein the PWM signal generator comprises:
a first signal generator, configured to output a first signal having a third level in a first period corresponding to a first time where a gate control signal to control the on/off of the switching transistor changes from a first level to a second level;
a first comparator, configured to compare the third voltage with first and second reference voltages, and when the comparison determines that the third voltage is lower than the first reference voltage, to output a second signal having a fourth level, and when the comparison determines that the third voltage is higher than the second reference voltage, to output the second signal having a fifth level;
a first logical operation unit, configured to receive the first and second signals through a corresponding first terminal and a second terminal, and to output a third signal having a seventh level when the first signal changes from a sixth level to the third level or from the third level to the sixth level while the second signal is at the fifth level;
a second comparator, configured to compare the third voltage with a third reference voltage, and when the comparison determines that the third voltage is higher than the third reference voltage, to output a fourth signal having an eighth level, and when the comparison determines that the third voltage is lower than the third reference voltage, to output the fourth signal having a ninth level;
a pulse string generator, configured to generate a first pulse string signal, which has a tenth level during a second period from the first time and an eleventh level during a third period subsequent to the second period, and a second pulse string signal, which has a twelfth level during the fourth period from the first time and a thirteenth level during a fifth period subsequent to the fourth period; and
a second logical operation unit configured to receive the fourth signal through a third terminal, and to output a fifth signal, which has the same level as the fourth signal of the second time when the third signal has the seventh level, and has a fifteenth level when the third signal has a fourteenth level, at a second time where the first pulse string signal shifts from the tenth level to the eleventh level.

7. The SMPS of claim 6, wherein the switching transistor is in an on state when the gate control signal has the first level, and is in an off state when the gate control signal has the second level.

8. The SMPS of claim 7, wherein the PWM signal generator further comprises a gate driver configured to generate the gate control signal corresponding to the second signal, the fifth signal and the second pulse string signal.

9. The SMPS of claim 8, wherein the gate driver is configured to drive the SMPS in the CCM by changing the gate control signal to the first level when the third signal has the seventh level and the fifth signal has the eighth level, at the second time.

10. The SMPS of claim 9, wherein the third signal has the seventh level at the second time when the third voltage remains higher than the second reference voltage from the first period to the second time.

11. The SMPS of claim 8, wherein the gate driver is configured to change the gate control signal to the first level if the second signal becomes the fourth level while the second pulse string signal remains the twelfth level after the second time.

12. The SMPS of claim 8, wherein the gate driver is configured to change the gate control signal to the first level simultaneously with the fourth period ending if the second signal does not become the fourth level until the four period is ended after the second time.

13. The SMPS of claim 6, wherein the first signal generator comprises:
a signal delayer configured to delay the gate control signal for the first period, to invert the delayed signal and to output the inverted signal; and
a third logical operation unit configured to logically combine the gate control signal and an output signal of the signal delayer.

14. The SMPS of claim 13, wherein the signal delayer includes an odd-number of inverters.

15. The SMPS of claim 6, wherein the first comparator is configured to output the second signal that is output prior to the time of the comparison when the third voltage is higher than the first reference voltage and lower than the second reference voltage.

16. The SMPS of claim 6, wherein the fourth period is longer than the second period.

17. The SMPS of claim 6, wherein the first reference voltage is lower than the second reference voltage.

18. The SMPS of claim 6, wherein the third voltage is higher than the first and second reference voltages.

19. The SMPS of claim 6, wherein the pulse string generator is configured to change the first and second pulse string signals to the tenth and twelfth levels, respectively, when the gate control signal changes to the first level.

20. The SMPS of claim 6, wherein:
the first level, the fifth level, the sixth level, the seventh level, the eighth level, the tenth level and the twelfth level are a high level; and
the second level, the third level, the fourth level, the ninth level, the eleventh level, the thirteenth level, the fourteenth level and the fifteenth level are a low level.

21. A method of driving a SMPS that supplies power to a second coil and a third coil of a secondary side of a transformer according to an operation of a switching transistor coupled to a first coil of a primary side of the transformer, configured to transform an input DC voltage, the method comprising the steps of:
(a) sensing a turn-on time of the switching transistor;
(b) generating a first pulse string signal that maintains a first level during a first period from the turn-on time;
(c) determining whether a second voltage proportional to a first voltage generated in the third coil has a resonance waveform until a first time where the first pulse string signal shifts to a second level;
(d) driving the SMPS in a Continuous Conduction Mode (CCM) when the second voltage is determined not to have the resonance waveform until the first time; and
(e) driving the SMPS in a Discontinuous Conduction Mode (DCM) when the second voltage is determined to have the resonance waveform before the first time.

22. The method of claim 21, wherein in the step (b), a second pulse string signal to maintain a first level is further generated during a second period set longer than the first period from the turn-on time.

23. The method of claim 22, wherein the step (e) comprises the steps of:
(e1) determining whether the second voltage reaches a lowest point of the resonance waveform from the first time to a second time where the second pulse string signal shifts to a third level;
(e2) turning on the switching transistor when it is determined that the second voltage has reached the lowest point of the resonance waveform; and
(e3) turning on the switching transistor at the second time when it is determined that the second voltage has not reached the lowest point of the resonance waveform.

24. The method of claim 23, wherein the first level is a high level and the second and third levels are a low level.

* * * * *